United States Patent [19]
Giguere et al.

[11] 3,848,110
[45] Nov. 12, 1974

[54] PORTABLE ELECTRIC GRILL APPLIANCE

[75] Inventors: Andre N. Giguere; Rheal A. Thibodeau, both of Beauceville, Quebec, Canada

[73] Assignees: Marie Martle Poulin Giguere; Agathe Cote Thibodeau, both of Beauceville, Quebec, Canada

[22] Filed: July 25, 1973

[21] Appl. No.: 382,317

[52] U.S. Cl. ............... 219/525, 99/331, 99/380, 219/386, 219/443, 219/460, 219/461, 219/462, 219/463, 219/530, 219/536
[51] Int. Cl. .......................................... H05b 3/06
[58] Field of Search ...... 99/331, 375, 380; 219/386, 219/443, 460, 461, 524, 525, 536, 540, 462, 463

[56] References Cited
UNITED STATES PATENTS

| | | | |
|---|---|---|---|
| 2,105,814 | 1/1938 | Lent | 219/525 X |
| 2,230,728 | 2/1941 | Propernich | 99/375 X |
| 2,710,906 | 6/1955 | Lipsich et al. | 219/525 X |
| 2,765,727 | 10/1956 | Lipsich et al. | 99/331 |
| 2,890,318 | 6/1959 | Kruse | 219/540 |
| 2,899,888 | 8/1959 | Koci | 99/331 |
| 2,944,138 | 7/1960 | Goff | 219/540 X |
| 3,172,999 | 3/1965 | Sutton et al. | 219/524 |
| 3,256,804 | 6/1966 | Petrin | 99/380 |
| 3,493,726 | 2/1970 | Bardeau | 219/443 |
| 3,590,215 | 6/1971 | Anderson | 219/525 X |

FOREIGN PATENTS OR APPLICATIONS

| | | | |
|---|---|---|---|
| 511,872 | 10/1920 | France | 219/460 |

*Primary Examiner*—Volodymyr V. Mayewsky

[57] ABSTRACT

A portable electric grill appliance comprising a lower and an upper grill chassis each of which has a bottom wall, side walls about the bottom wall and a grill plate of heat conductive material defining an upper wall. A resistive heating element is secured in contact with the grill plate of each chassis. The lower and upper chassis are interconnected by hinge means along one of their side walls to permit the upper chassis to be displaced through a 180° arc from a position where both grill plates lie side-by-side in a common horizontal plane to a further position where both grill plates face each other in substantial juxtaposition. Support means are also provided to support each of the chassis bottom walls above the common horizontal plane.

10 Claims, 9 Drawing Figures

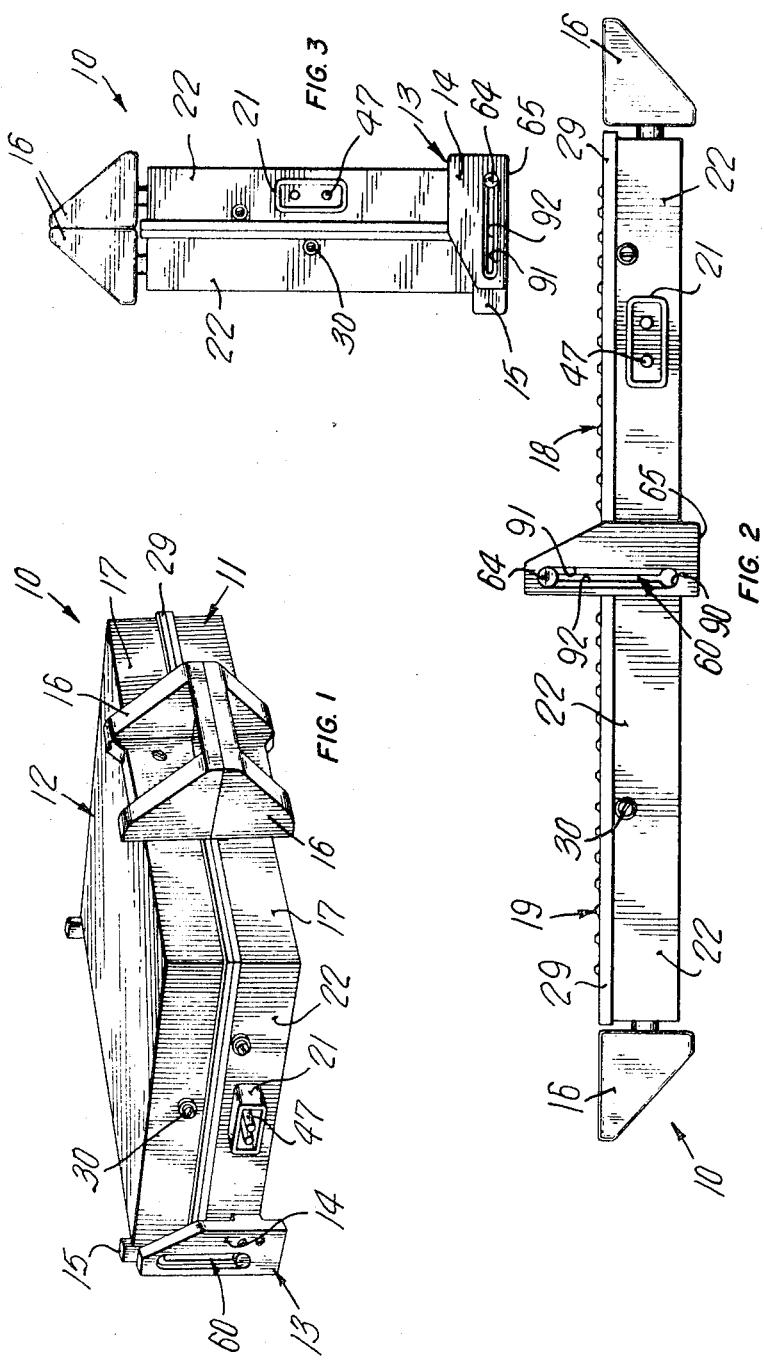

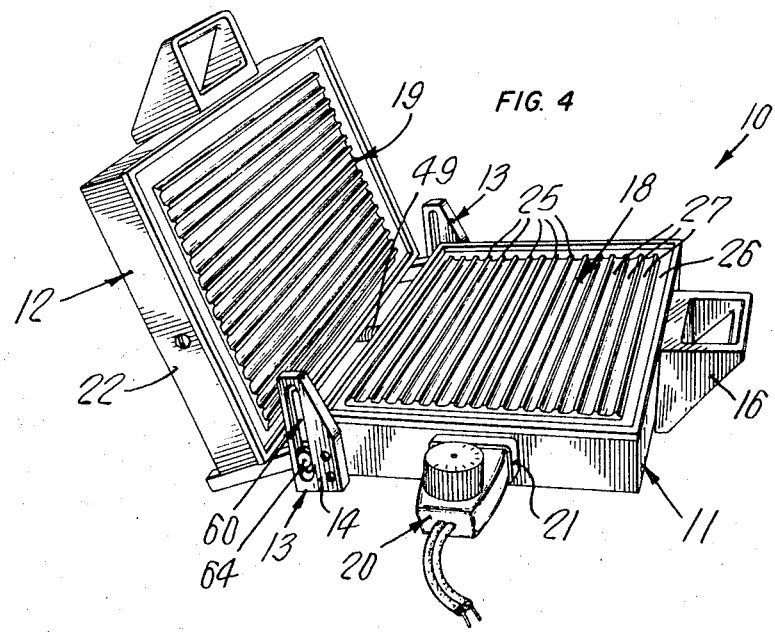
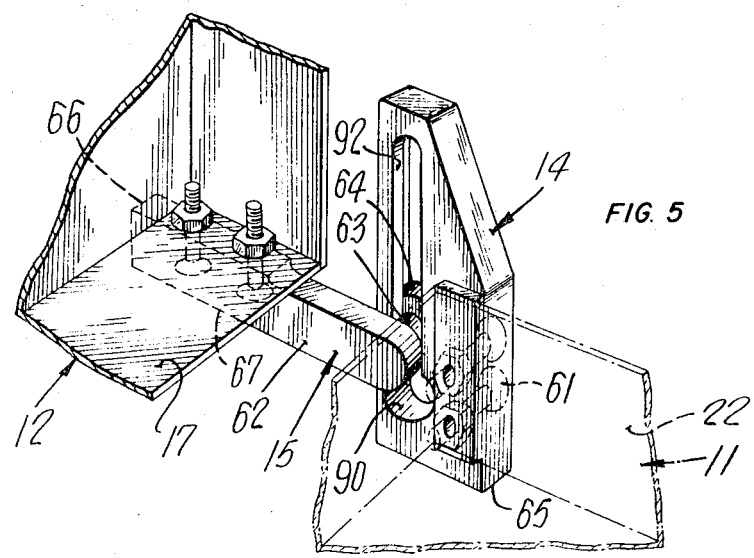

3,848,110

PORTABLE ELECTRIC GRILL APPLIANCE

BACKGROUND OF INVENTION

A. Field of the Invention

The present invention relates to an electrical household appliance and more particularly to a portable electric grill having two grilling surfaces.

B. Description of Prior Art

Heretofore known electric grill appliances are provided for cooking small food portions which do not require high wattage heating elements. A disadvantage of utilizing high wattage heating elements, in the range of 1500 watts, for such household appliances is that the appliance device generates too much heat and may become a fire hazard if utilized over combustible materials.

A further disadvantage of prior art electric grill appliances is that these have generally small heating surfaces and are not adequate for cooking large food portions such as steaks, roasts, fish, etc. Furthermore, known electric grill appliances are not constructed for easy handling and storage.

SUMMARY OF INVENTION

IT is a feature of the present invention to provide a portable electric grill appliance utilizing high wattage heating elements, in the range of 1,500 watts from a 115 volts, 60 cycle supply, and which substantially overcomes the above-mentioned disadvantages.

It is a further feature of the present invention to provide a portable electric grill appliance with increased heating surface area and which is easily maneuverable.

According to these features, from a broad aspect, the present invention provides a portable electric grill appliance comprising a lower and an upper grill chassis each of which has a bottom wall, side walls about the bottom wall and a grill plate of heat conductive material defining an upper wall. A resistive heating element is secured in contact with the grill plate of each chassis. The lower and upper chassis are interconnected by hinge means along one of their side walls to permit the upper chassis to be displaced through a 180° arc from a position where both grill plates lie side-by-side in a common horizontal plane to a further position where both grill plates face each other in substantial juxtaposition. Support means are also provided to support each of the chassis bottom walls above the common horizontal plane.

BRIEF DESCRIPTION OF DRAWINGS

A preferred embodiment of the present invention will now be described with reference to the accompanying drawings in which:

FIG. 1 is a perspective view of the portable electric grill of the present invention FIG. 2 is side view of the grill in its open position;

FIG. 3 is an end view of the grill in its storage end position;

FIG. 4 is a perspective view of the grill in its semi-open position;

FIG. 5 is a fragmented view of the hinge;

DESCRIPTION OF PREFERRED EMBODIMENTS

Figure 6:
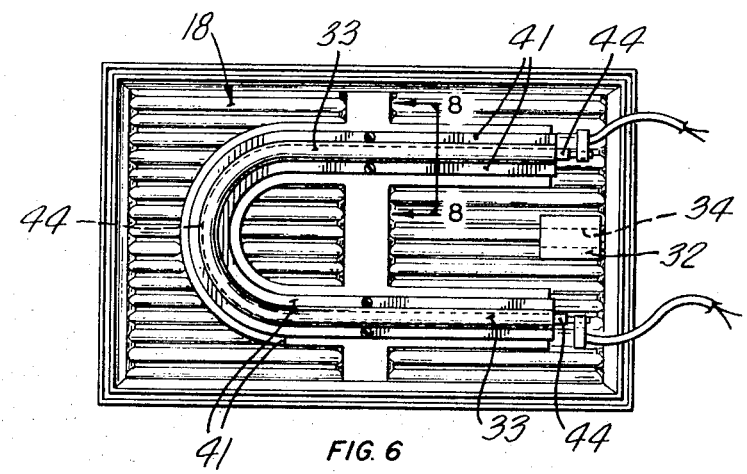
FIG. 6 is a cross-sectional fragmented view of the grill chassis.

Referring now to FIGS. 1 to 4 of the drawings, there is shown generally at 10 the portable electric grill appliance of the present invention. The grill 10 comprises a lower grill chassis 11 and an upper grill chassis 12, both of which are of substantially rectangular configuration. The upper grill chassis 12 is connected to the lower grill chassis 11 by a hinge 13 whereby the chassis 12 can be juxtaposed over the chassis 11 and further provide other important functions as will be described later. The hine 13 is made of two members, a channel member 14 and a channel connector member 15. The construction of the hinge 13 will be described in detail later. The hinge members 14 and 15 are secured adjacent the edge of a longitudinal side wall of their respective chassis and a handle member 16 is secured centrally on the opposite side wall 17 of each chassis. A lower grill plate 18 and an upper grill plate 19 are secured respectively to the lower chassis 11 and upper chassis 12 whereby these grill plates will face each other when said chassis are in juxtaposition. Eelectrical power is supplied to the grill plates 18 and 19 by a thermostatic control connector 20 connected to an electrical receptacle 21 secured to an end wall 22 of the lower chassis 11.

As can be seen from FIG. 4, the upper and lower grill plates 18 and 19 each have an undulated surface defining elongated ridges 25 extending in parallel relationship in a rectangular area slightly smaller than the total area of the plate. A continuous channel 26 is provided about the rectangular area containing the ridges 25 with its bottom surface being lower than the troughs 27 formed between adjacent ridges 25 whereby excess fluids present during the grilling of food will flow in the troughs 27 and collect in the channel 26. The peripheral groove 28 (see FIG. 6) of each plate extends below the undulated surface and receives the upper edge of the chassis side and end walls and a ridge 29 extends beyond the side and end walls of the chassis. Screws 30 extend through the chassis end walls 22 and secure in an aligned threaded bore provided in the end peripheral walls 28 of the plates to rigidly secure the plates 18 and 19 to their respective chassis.

The grill plates 18 and 19 are formed of aluminium and their outer surfaces are coated with a tetrafluoroethylene resin commonly identified by the trademark "TEFLON" for easy cleaning and grilling.

Referring particularly to FIG. 1, both chassis 11 and 12 have opposed longitudinal side walls 17, end walls 22 and a bottom wall 23. Two transverse supports 40 are secured between the side walls 17 above the bottom wall 23 and substantially at mid height of the side walls 17. A metallic reflector plate 42 is secured to the supports 40 to reflect radiated heat back at the grill plate.

Figure 7:
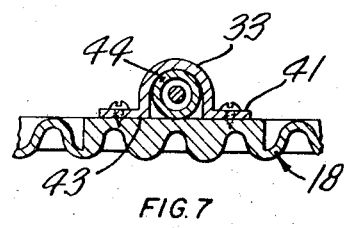
FIG. 7 is a bottom view of a grill plate.

As shown in FIG. 7, the lower grill plate 18 is provided with an extension 32 formed integral with the underside thereof and located adjacent the electrical receptacle 21 whereby a tubular heat sensing element (not shown) on the plug 20 will extend in a through-bore 34 formed therein. The element 33 senses the temperature of the lower grill plate 18 to thereby control the supply of electrical current to resistive heating elements 44 secured to the plates 18 and 19.

Figure 8:
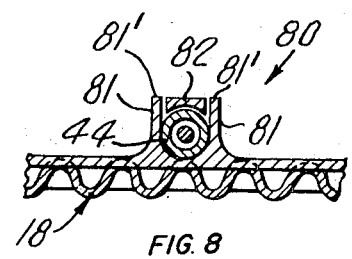
FIG. 8 is a sectional view along cross-section lines 8—8 of FIG. 7.
Figure 9:
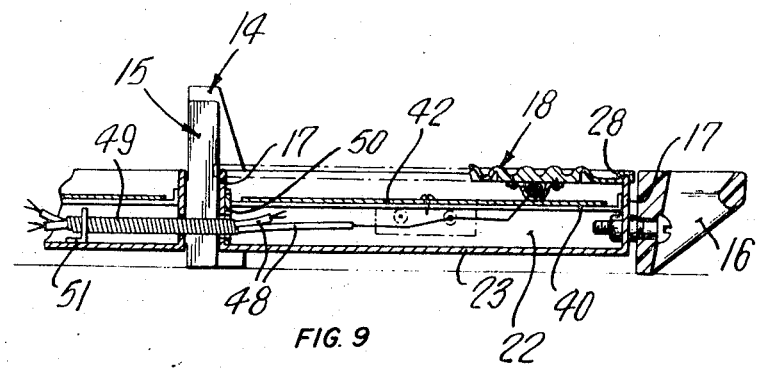
Fig. 9 is a cross-sectional fragmented view of a further embodiment of the grill plate heating element.

With particular reference to FIGS. 7 to 9, it can be seen that the resistive heating elements 44 are of substantially U-shaped configuration and secured in close contact to the grill plates 18 and 19 to transmit heat directly into these plates and to minimize heat radiation in the direction of the chassis bottom wall, end walls and side walls. The elements 44 are retained in an enclosed channel, herein a U-shaped aluminum channel cover 33 which is provided with side flanges 41 for securing the cover 33 to a flat surface portion 43 provided in the rear surface of each grill plate. With this arrangement, heat radiation below the grill plate is minimized, thus obtaining effective heat conduction in the grill plate and preventing overheatng the chassis bottom and side walls.

Alternately, as shown in FIG. 9, a U-shaped channel 80 may be formed integral with the grill plate and define outwardly extending spaced apart crimp flanges 81. The channel 80 is preferably of U-shaped cross-section to receive the tubular heating element 44 in close surface contact therein. A heat conducting cover 82 is positioned over the element 44 and retained in facial contact thereover by crimping the upper end portion of the flanges 81 thereover. Thus, the elements 44 are rigidly retained and encased in its grill plate for improved heat conduction and substantial reduction in radiated heat. The elements 44 are rated at 34 watts/in$^2$ and operate from the conventional 115 volts 60 cycle household electrical outlet.

The two U-shaped heating elements 44 are connected in parallel across the input electrical terminals 47 of connector 21. To connect the end of the heating element 44 located in the upper chassis 12, it is necessary for the electrical wires 48 to traverse both chassis 11 and 12. With the arrangement shown in FIG. 6, the wires 48 cross the chassis through their rear side walls 17, intermediate the hinges 13, whilst permitting the upper chassis 12 to be tilted within a 180° arc without interference from the cable traversing both chassis side walls. This is achieved by locating the wires 48 in a hollow spring member 49, which is secured adjacent one of its ends to the side wall 17 of the lower chassis 11 by suitable securing means such as the spring leaf 50. The spring 49 traverses both side walls 17 and extends a sufficent distance within the upper chassis 12 whereby a portion thereof is always within chassis 12. Adjacent the free end of the spring 49 there is secured a metal clip 51 to ensure that the spring never extends out of the side wall of the upper chassis 12. Thus, as the upper chassis 12 is moved through a 180° arc, the spring 49 and wires 48 move in and out of the upper chassis through a hole and without interference. The connected end of the wires 48 are held stationary to prevent breakage of the wires at their terminal connection with the element 44.

Ventilating slots (not shown) may be located in the side walls of both chassis whereby to vent the interior area of both chassis below the reflector plate 42 to prevent excessive heating of the chassis.

Referring now more particularly to FIGS. 3, 4 and 5, there is illustrated the construction of the hinge 13 which may be fabricated of suitable plastic or metallic materials. As shown, the channel member 14 is secured to the end wall 22, adjacent the end edge of the wall, by suitable means such as screws 61. A small portion of member 14 extends beyond the bottom wall 23 and constitutes a leg 64 to support the chassis 11 above a support surface. An elongated guide channel or slot 60 is formed within the member 14 and extends vertically relative to the horizontal plane of the chassis 11. The slot 60 is provided with inwardly projecting flanges 91 extending along the length thereof from above a bottom portion to provide an enlarged opening 90 to permit connection to the connector member 15. Therefore, the slot 60 defines an elongated restrictive throat opening 92. The member 14 further defines a flat vertical longitudinal edge 65 to provide a leg support to maintain the grill 10 in a closed vertical position (as shown in FIG. 2) and thus capable of storage in a narrow space.

The connector member 15 is formed by an elongated arm 62 secured adjacent the end edge of side wall 17 of the upper chassis 12 and extends vertically above the grill plate 19 to define a connecting end where there is provided a pin 63, of circular cross-section, and extending at right angles to the arm 62 and outwardly to the end walls of the chaSsis 12. The free end of the pin 63 terminates in a connecting end herein an enlarged flat disc-shaped head 64 of larger diameter than the pin but slightly smaller than the bottom opening 90 whereby to move along the slot 60 above the flanges 91 and thus in a restrictive slot 60. The ends of the slot 60 are arcuately shaped to conform to the contour of the head 64 and to facilitate relative arcuate movement therewith. The throat 92 will accommodate the movement of the pin 63 therealong. The other end of the arm 62, opposite the connecting end, extends beyond the bottom wall 23 to define a leg 66 to support the wall 23 above a support surface when the chassis 12 is fully open as shown in FIG. 2. Also, a portion of the handle 16 extends above the bottom wall and constitutes a still further leg 71 for the longitudinal side wall 17 opposite the interconnected one. The outside longitudinal edge 67 of the arm 62 is flat and in conjunction with the edge 65 provides the proper support to support the grill 10 on its edge, as shown in FIG. 3.

It can be seen that with the hinge 13 of the present invention, there is no danger that these will disengage from one another. Further, the hinge meintains the chassis in substantially parallel relationship as these are hinged away from each other. This is particularly advantageous when a portion of food is placed between the grill plates and to one side thereof. The hinge 16 will minimize arcuate displacement of the upper chassis with the lower chassis to ensure good contact with the upper surface of the food between the plates. Without the head 64 the upper chassis would easily disengage by angulating it from edge to edge and it would be difficult to maintain it in good contact with the food being grilled. In this particular embodiment of the hinge, the plates may be spaced apart to a distance of approximately 2½ inches to receive pieces of food of at least that thickness whilst the plates are maintained substantially parallel to each other with the food therebetween.

The construction of the above-described electric grill appliance provides an improved grill appliance which is easily portable, offers an increased grilling surface area, easy to construct, does not overheat the chassis, is easily storable and has multi-purpose use.

We claim:

1. A portable electric grill appliance comprising a lower and upper grill chassis, each said grill chassis having a bottom wall, side walls about said bottom wall and a grill plate of heat conductive material defining an upper wall; a resistive heating element secured within a channel provided on the underface of said grill plate of each said chassis whereby a substantial portion of said heating element will be encased in said grill plate to minimize heat radiation in the area between said chassis bottom wall and said grill plate, a hinge connecting said lower and upper chassis along one of their side walls to permit said upper chassis to be displaced through an arc from a position where both said grill plates lie side-by-side in a common horizontal plane to a further position where both said grill plates face each other in substantial juxtaposition to a further position where at least the lower grill plate is accessible, said hinge having a channel member secured to each end walls of said bottom chassis adjacent the end edge of a side wall and extending above said lower chassis grill plate, an elongated connector member secured to a side wall of said upper chassis near each end edge thereof and extending above said upper chassis grill plate to define a connecting end, said channel members and said connector members extending above said lower and upper chassis bottom wall to constitute support legs, a further leg secured to each said lower and upper chassis and located centrally of the side wall remote from the hinge, said support legs and further leg supporting the bottom wall of each said chassis above a common horizontal plane, and support means for supporting each said chassis bottom wall above said common horizontal plane when resting thereon.

2. An electric appliance as claimed in claim 1, wherein said channel is formed by a metallic channel cover which is detachably secured to said underface of said grill plate.

3. An electric appliance as claimed in claim 1, wherein said channel is integrally formed in said grill underface to receive said heating element, said channel having spaced apart flanges extending outwardly of said underface to accommodate said heating element therebetween and a heat conducting cover positioned and retained over said heating element.

4. An electric appliance as claimed in claim 3, wherein said flanges are crimped at their upper end over said heat conducting cover to retain said cover in facial contact with said heating element.

5. An electric appliance as claimed in claim 1, wherein each said grill chassis are of substantially rectangular shape and define two elongated side walls and two end walls, an elongated slot in said channel member extending vertically to the surface of said lower chassis grill plate, and a pin of circular transverse cross-section in said connecting end of said connector member having an enlarged disc-shaped end and extending outwardly towards a respective end wall of said upper chassis, each said connecting end being received and retained within a respective one of said slots to thereby interconnect said upper chassis to said lower chassis and permitting said upper chassis displacement and said upper chassis to be spaced a predetermined distance above said bottom chassis when juxtaposed.

6. An electric appliance as claimed in claim 5, wherein said slot has a bottom opening to permit passage of said connecting end and an elongated throat opening extending from above said bottom opening along said slot to accommodate movement of said pin therealong.

7. An electric appliance as claimed in claim 6, wherein said pin has a circular cross-section and said slot has arcuate ends to permit rotatable support of said pin in either one of said ends.

8. An electric appliance as claimed in claim 1, wherein said heating element in said upper chassis is connected to electrical terminals in said lower chassis by means of electrical wires passing through a respective side wall of both said chassis, said electrical wires passing through a longitudinal hollow member secured adjacent one of its ends in a hole in one of said respective side walls between said further wall means and bottom wall and extending through an adjacent hole in the other respective side wall whereby a portion only of said hollow member will move in and out of said other side wall as said upper chassis is displaced through said 180° arc.

9. An electric appliance as claimed in claim 1, wherein a sheet of heat reflecting material is secured in a substantially horizontal plane and elevated from said bottom wall whereby heat radiated by said grill plate will be reflected back on said grill plate.

10. An electric applicance as claimed in claim 9, wherein at least one of said side walls of each said lower and upper chassis is perforated to provide ventilation between said grill plate and said bottom wall.

* * * * *